United States Patent [19]

Bauer

[11] 3,827,078

[45] July 30, 1974

[54] DIGITAL DATA RETRIEVAL SYSTEM WITH DYNAMIC WINDOW SKEW

[75] Inventor: Joseph John Bauer, Agoura, Calif.

[73] Assignee: Burroughs Corporation, Detroit, Mich.

[22] Filed: Nov. 1, 1972

[21] Appl. No.: 302,914

[52] U.S. Cl. .................................................. 360/45
[51] Int. Cl. .................................................. G11b 5/44
[58] Field of Search ........................ 340/174.1 A, 340/174.1 B, 174.1 H

[56] References Cited

UNITED STATES PATENTS

| | | | |
|---|---|---|---|
| 3,609,560 | 9/1971 | Greenberg | 340/174.1 H |
| 3,636,536 | 1/1972 | Norris | 240/174.1 H |
| 3,656,149 | 4/1972 | Srivastova | 340/174.1 H |
| 3,684,967 | 8/1972 | Kelly | 340/174.1 H |
| 3,689,903 | 9/1972 | Agrawalz et al. | 340/174.1 H |
| 3,737,895 | 6/1973 | Cupp et al. | 340/174.1 H |

*Primary Examiner*—Vincent P. Canney
*Attorney, Agent, or Firm*—Albin H. Gess; Benjamin F. Spencer; Edward G. Fiorito

[57] ABSTRACT

In a system for retrieving data from a record medium wherein the retrieved data is decoded by data window signals synchronized to data clock signals, the data window signals are skewed dynamically in response to existing phase error between the data clock signals and the retrieved data. A phase error detector, comprising two flip-flops and a differential amplifier, senses the phase displacement of the raw data with respect to the data clock signals, and produces a window skew signal which is supplied to the data window signal generating circuit.

2 Claims, 4 Drawing Figures

DIGITAL DATA RETRIEVAL SYSTEM WITH DYNAMIC WINDOW SKEW

BACKGROUND OF THE INVENTION

The present invention relates generally to improvements in digital data retrieval systems and more particularly pertains to new and improved digital data retrieval systems wherein the data is retrieved from an electro-magnetic record medium by a transducer.

In data storage and retrieval systems utilizing magnetic storage mediums and self-clocking encoded digital data, the quest has been towards developing data retrieval circuitry which can operate to retrieve a higher density recorded data from the storage medium, with the same or a smaller data error ratio than systems having less densely packed data on the storage medium. The prior art has recognized that the use of self-clocking type of recording codes such as the modified frequency modulated (MFM) code permits the recording of digital data, represented by flux transitions, closer together on the magnetic medium and that during the recovery process these flux transitions exhibit what is known as "peak shift," thereby causing a high error ratio. To compensate for this peak shift phenomena the prior art has endeavored in various ways both complicated and uncomplicated to synchronize the clock signal recovered from the record medium to the data recovered from the record medium. One prior art way of accomplishing this is to utilize a phase lock loop circuit wherein a voltage controlled oscillator is continually having the frequency of its pulse output signal varied according to the phase difference between the raw data recovered from the storage medium and the frequency of the voltage controlled oscillator at the comparison time. The pulse output signal of the voltage controlled oscillator is then used to decode the data retrieved from the magnetic medium, that is, separate the binary "one" data signals from the binary "zero" data signals by having this pulse output signal driving a data window generating circuit.

The prior art has stopped at this point, apparently failing to realize or perhaps willing to put up with the fact that this data synchronized clock signal still exhibits phase differences with respect to the data recovered from the storage medium. This difference or error may be due to the inability of the phase lock loop circuitry of the prior art to synchronize the clock signal to the recovered data. Whatever the cause of this phase error between the data locked clock signal so produced and the recovered data, its presence causes errors in the data recovery process.

SUMMARY OF THE INVENTION

It is therefore an object of this invention to provide a data retrieval system that has fewer data recovery errors than prior art systems.

Yet another object is to provide a data retrieval system that exhibits a lower error ratio for recovered data than prior art systems and is more easily implemented with consequently less cost.

These objects and the general purpose of this invention are accomplished by detecting the phase error between raw data recovered from a record medium and the data clock signals used to generate a data recovery window, and utilizing this phase error signal to dynamically skew the data recovery window in response thereto. The phase error between the recovered raw data and the data clock signals is detected by two flip-flops and a differential amplifier which function to generate a data window skew signal utilized by a data window generating circuit.

BRIEF DESCRIPTION OF THE DRAWINGS

The exact nature of this invention as well as other objects and advantages thereof will be readily apparent from consideration of the following specification related to the annexed drawings in which.

DESCRIPTION OF THE PREFERRED EMBODIMENT

Figure 1:
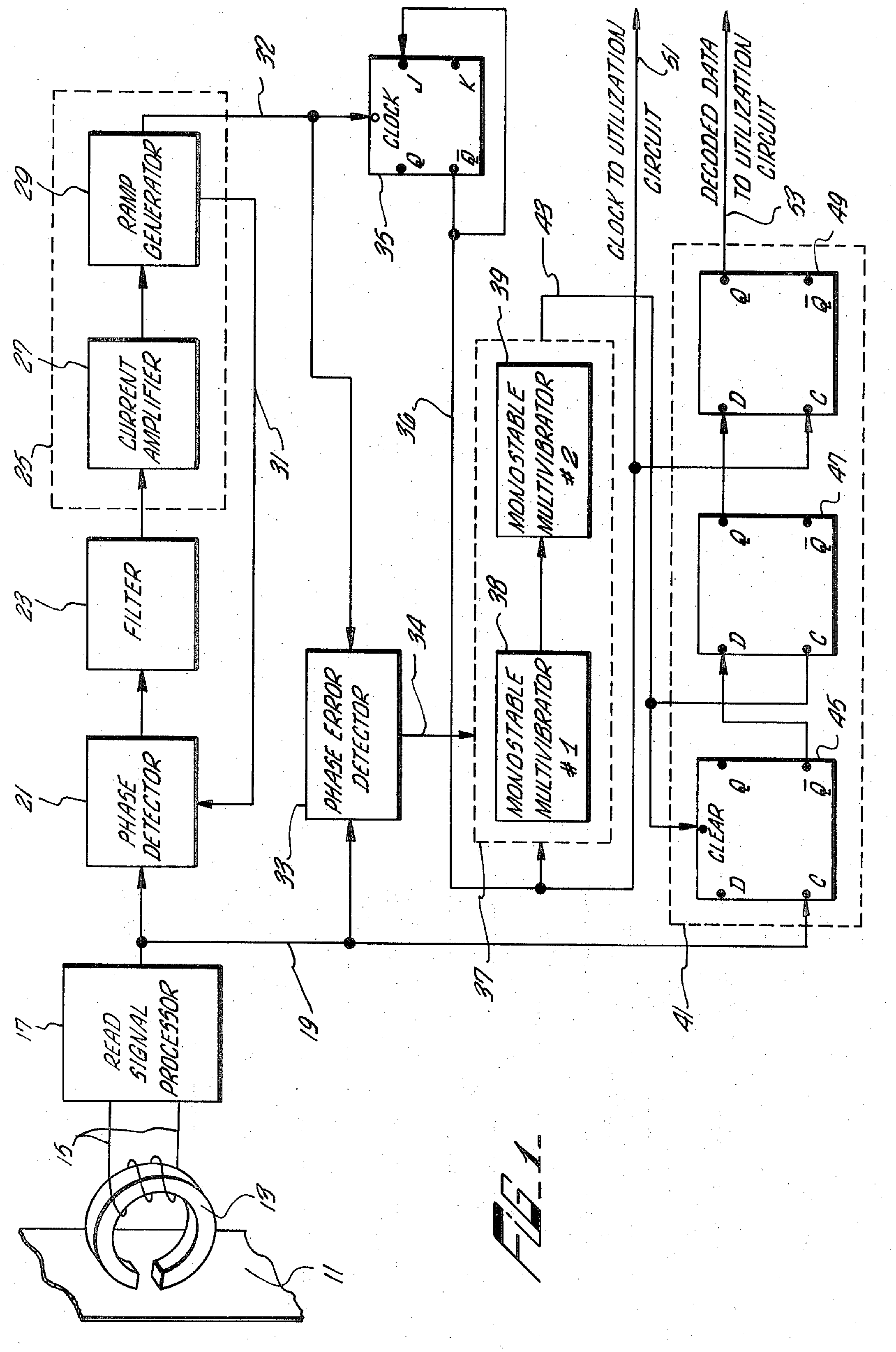
FIG. 1 is a block diagram illustration of a data recovery system which embodies the present invention.

FIG. 1 which illustrates a preferred embodiment of the data recovery system of the present invention shows a magnetic medium 11 from which data is recovered by a transducer 13, the output of which is presented by way of wires 15 to a read signal processor 17. The output of the read signal processor 17 is presented to a phase lock loop circuit comprising a phase detector 21, filter 23, and a voltage control oscillator 25 consisting of a current amplifier 27 and a ramp generator 29. The operation of these elements of the data retrieval circuit, the read signal processor 17, phase detector 21, filter 23 and the voltage controlled oscillator 24, are explained and illustrated in an application entitled "Method and Apparatus for Coded Binary Data Retrieval" assigned to the Assignee of this invention having U.S. Ser. No. 302,915, filed Nov. 1, 1972.

The output on line 19 of the read signal processor 17 is presented to a phase error detector circuit 33 which in addition to the raw data signals receives the digital clock train output on line 32 of the voltage controlled oscillator 25. In a preferred embodiment, the frequency rate of the clock pulses appearing on line 32 are twice the frequency rate of the data recorded on the electromagnetic medium 11. Therefore, a flip-flop, such as a JK flip-flop 35 or the like, is used to produce a clock signal on line 36 that has a frequency equal to the frequency rate of the recorded data. This divided down clock signal is supplied to a window generating circuit 37, decode circuit 41, and over line 51 to a data utilization circuit (not shown).

The window generating circuit 37 comprises a number one monostable multivibrator 38 and a number two monostable multivibrator 39, number one monostable multivibrator 38 determining the start of the window and number two monostable multivibrator 39 determining the end of the window. The window signal thus generated by the window generator 37 is supplied over line 43 to a decoding circuit 41 which comprises three D type flip-flops 45, 47 and 49. The output of the decoder circuit 41 on line 53 consists of decoded data supplied to a data utilization circuit (not shown). The window generator 37 and the decoder circuit 41 is completely described in an application assigned to the Assignee of the present invention entitled "Method and Apparatus for Decoded Binary Data Retrieval" having U.S. Ser. No. 302,915 filed Nov. 1, 1972.

Figure 2:
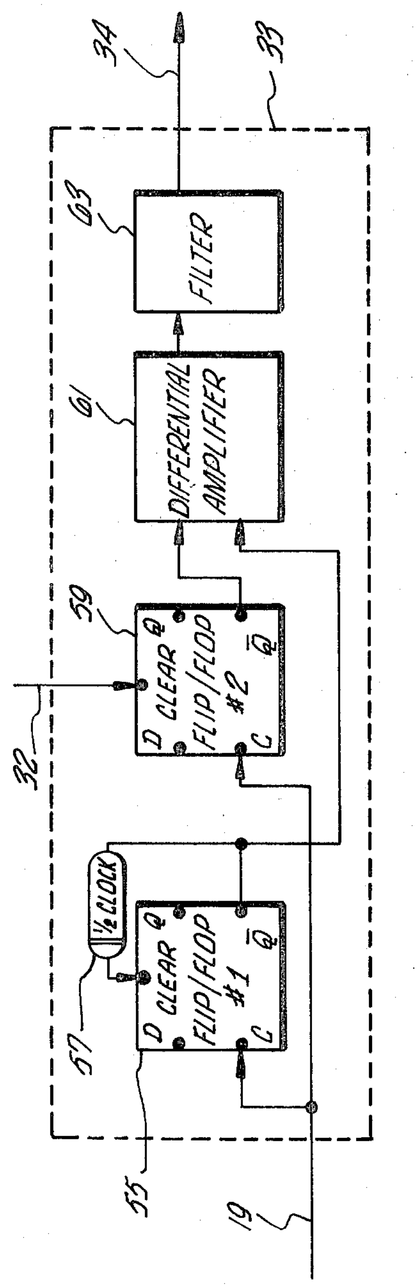
FIG. 2 is a block diagram illustration of a preferred phase error detector circuit used in FIG. 1.

Referring now to FIG. 2 which illustrates a preferred embodiment of the phase error detector 33 of FIG. 1, a number one flip-flop 55 receives raw data on line 19 at its clock (C) input and is cleared by a signal half a clock time after each data pulse is received. A number two flip-flop 59 also receives the raw data at its clock (C) input, but it is cleared by the data synchronized clock signal from the voltage controlled oscillator 25 (FIG. 1) on line 32. The outputs of the number two flip-flop 59 and the number one flip-flop 55 are supplied to a differential amplifier 61 which generates an analog voltage signal representing the difference between the two inputs to a filter 63, that can be an RC filter of the like, for smoothing the fluctuation of the output of the differential amplifier 61. The output of the filter 63 is supplied over line 34 to the window generating circuit 37 (FIG. 1). The analog voltage signal on line 34 is supplied to the timing terminals of the number one monostable multivibrator 38 in the window generating circuit 37 (FIG. 1), thereby causing the number one monostable multivibrator 38 (FIG. 1) to time out sooner or later than its normal period, depending upon the amplitude of the voltage supplied to it.

Figure 3:
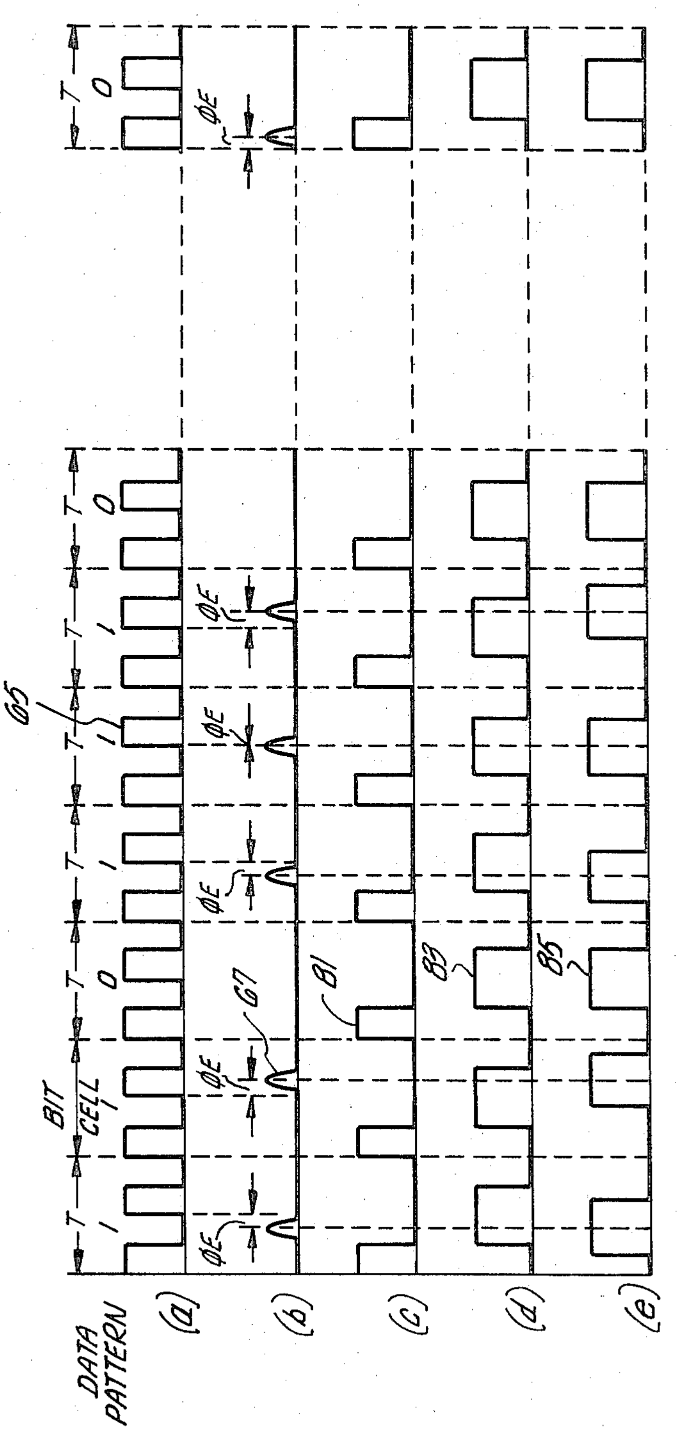
FIG. 3 is a wave form diagram illustration of the relationship of the circuits represented in FIG. 1, with and without the present invention.

Referring now to FIG. 3 which illustrates the function of the window generating circuit 37, without the phase error detector circuit 33 and with the phase error detector circuit 33, it is assumed that the data pattern shown, 1 1 0 1 1 1 0 0, is being recovered from the electromagnetic medium 11 (FIG. 1). The series of clock pulses 65 at (*a*) of FIG. 3 are shown to be at twice the frequency of the recorded data. The recovered raw data 67 at (*b*) of FIG. 3 is assumed, for illustration purposes, to be encoded according to the modified frequency modulation (MFM) encoding scheme. Each of the flux transitions 67 occurring approximately in the middle of a bit cell represent a binary one bit. As is evident, all but one of these flux transitions have shifted their location in time thereby creating a phase error ($\phi$E). The clock pulses 65 are reduced in frequency by a device such as a JK flip-flop 35, or the like, so that the clock frequency equals the recorded data frequency. This reduced frequency clock is supplied over line 36, as was noted earlier, to the window generator 37 and specifically to number one monostable multivibrator 38 within the window generator.

Monostable multivibrator 38 has a certain time out period as dictated by its timing circuit. It shall be assumed for illustration purposes that the time out period of the number one monostable multivibrator 38 (FIG. 1) is one quarter of the clock cycle period of the clock being supplied to it. Therefore the output of the number one monostable multivibrator 38 (FIG. 1) will be a series of pulses 81 shown at (*c*).

The number two monostable multivibrator 39 (FIG. 1) responds to the negative transitions of the signal from number one monostable multivibrator 38 to go into its unstable state. The number two monostable multivibrator 39 also has a particular length time out period. Assuming for illustration purposes that the time out period of the number two monostable multivibrator is one half the clock cycle of the clock rate being supplied to the window generator 37, the output signal of the number two monostable multivibrator will be a series of data window pulses 83 shown at (*d*) of FIG. 3. This series of windows 83, at (*d*), that are supposed to strobe out the data represented by pulses 67 can be seen as having their centers out of line with the data pulse centers 67, except for the one data pulse that has a zero phase error. This is the condition that exists when the data window train 83 is not skewed to follow and correct for the phase error in the raw data recovered from the magnetic medium.

The window pulse train 85 shown at (*e*) of FIG. 3 represents data windows that are skewed to compensate for the phase error. It is immediately evident that the centers of the data windows line up perfectly with the centers of the raw data pulses, thereby considerably reducing the possibility of a loss or erroneous recovery of data during the retrieval process. How the data windows are dynamically skewed to compensate for the phase error that occurs during the data recovery process will now be explained with reference to FIG. 4 and FIG. 2.

Figure 4:
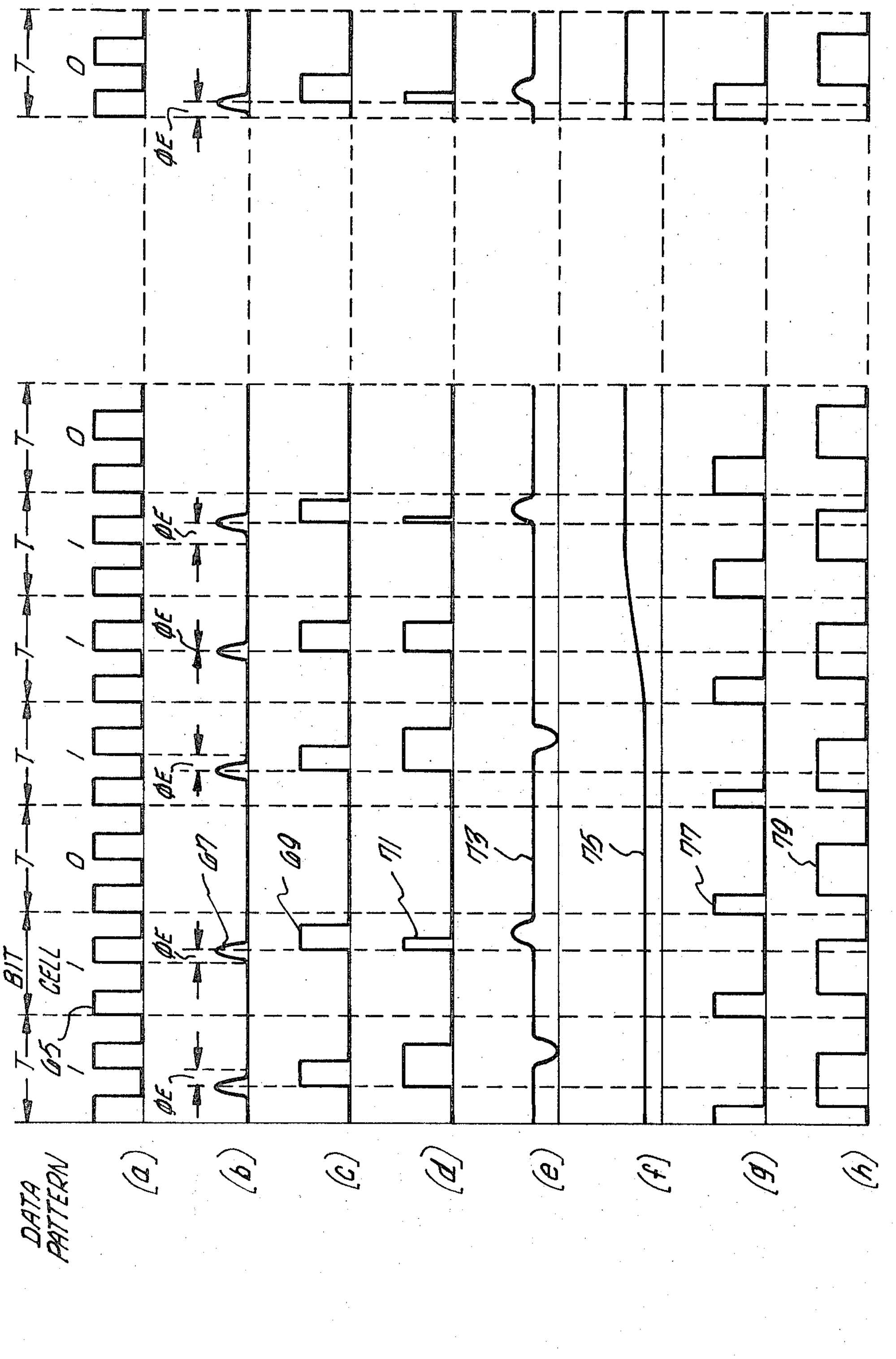
FIG. 4 is a wave form representation of the relationships of the circuits represented by FIG. 1 and FIG. 2 of the present invention.

Assuming again that the data pattern written is as shown on FIG. 4, a series of binary bits that correspond to 1 1 0 1 1 1 0 0, and that a modified frequency modulated encoding scheme is used, the clock signals 65, shown at (*a*) of FIG. 4, will appear on line 32 (FIG. 1) and the raw MFM data 67, shown at (*b*) of FIG. 4, will appear on line 19 (FIG. 1). Both of these signals are supplied to the phase error detector 33. Number one flip-flop 55 which is a D type flip-flop, commonly known in the art, receives the raw MFM encoded data at its clock (C) input causing the $\overline{Q}$ output to change its state at the occurrence of a data bit, as illustrated by the series of pulses 69 at (*c*) of FIG. 4. Number one flip-flop 55 is reset to its previous state, that is, to the state it was in before the occurrence of a data bit at its clock input, an amount of time equal to one half the clock cycle period of the clock signal being received by the phase error detector 33, after the occurrence of a data bit signal at its clock (C) input. This is accomplished by a delay element 57 connecting the $\overline{Q}$ output and the Clear input of number one flip-flop 55.

Number two flip-flop 59 also receives the raw MFM encoded data 19 at its clock (C) input, and in addition receives clock pulses on line 32 at its Clear input. The $\overline{Q}$ output of number two flip-flop 59 is therefore triggered to a different state upon the occurrence of a data bit at its clock input and it is reset or cleared during a negative transition of a clock signal being received on line 32. The output at the $\overline{Q}$ terminal of the flip-flop 59 which is, by the way, also a D type flip-flop is as illustrated by the series of pulses 71 at (*d*) of FIG. 4.

The two digital pulse trains 69 and 71 from number one flip-flop 55 and number two flip-flop 59 respectively, are simultaneously supplied to a differential amplifier 61. This amplifier is of a type well known in the art for differentially adding the signals at its input to produce an output signal having an amplitude that is the difference of the magnitudes of the input signals. The output of the differential amplifier 61 will, therefore, appear somewhat as illustrated by the signal 73 at (*e*) of FIG. 4. It can be seen that whenever the pulse width of the signal from number two flip-flop 59 is greater than the pulse width of number one flip-flop 55, the output of the differential amplifier 61 drops in amplitude, whereas when the reverse is the case, in other words the output signal of flip-flop number one has a greater pulse width than the output signal of the number two flip-flop 59, the output of differential amplifier rises in amplitude. It should be remembered that the rise and fall of the amplitude of the output signal in reference to the two input signals may be the exact opposite, if desired. If the output signal 73 of the differential amplifier 61 is supplied to a filter 63, which may be a smoothing type of filter such as an RC network or the like, that averages its input signal over several bit cell times, there will be produced an output signal 75 similar to that illustrated at (*f*) of FIG. 4. This signal 75 appears on line 34 of the data retrieval system and is supplied to the window generator 37 (FIG. 1).

This analog voltage signal 75 is supplied to the number one monostable multivibrator 38 causing it to vary its time constant characteristics, as is illustrated by the series of pulses 77 at (*g*) of FIG. 4, which are the output signals of number one monostable multivibrator 38 in the window generator 37 (FIG. 1). As can be seen from this pulse train 77, as the amplitude of the signal supplied to number one monostable multivibrator 38 increases, the time constant of the multivibrator 38 increases also, and as the signal amplitude decreases, the time constant decreases, thus, in effect, moving the start of the data window being generated back and forth as dictated by the incoming signal 75.

As was mentioned earlier, number two monostable multivibrator 39 is triggered by the negative transition of the signal supplied to it from number one monostable multivibrator 38. The time constant of number two monostable multivibrator is fixed. Therefore, the window signals 79 shown at (*h*) of FIG. 4 will be, in effect, skewed left or right depending upon the analog signal 75 supplied to the number one monostable multivibrator 38. This analog signal will be remembered to be a representation of the phase error existing between the raw recovered MFM data and the recovered clock signal.

Thus it can be seen that the present invention provides for a data recovery system that generates a data window that is skewed dynamically to compensate for the phase error that is inherent between the recovered clock signal and the recovered data, thereby considerably reducing the error ratio during data recovery. Obviously many modifications and variations of the present invention are possible in light of the above teachings. It is therefore to be understood that within the scope of the appended claims the invention may be practiced otherwise than as specifically described.

What is claimed is:

1. In a data retrieval system for retrieving digital data from a record medium wherein the retrieved data is decoded by data windows synchronized to data clock signals, circuitry for generating dynamically skewed data windows comprising:

means for generating phase error signals indicating the phase difference between the retrieved data and the data clock signals; and means for generating data windows displaced in time from their normal position, as dictated by the data clock signals, in response to the phase error signals from said phase error signal generating means.

2. A data retrieval system for retrieving digital data from a record medium wherein the data bits are recorded on the medium as flux transitions within bit cells at a base frequency, comprising:

means for recovering the stored data signals;

means for generating data clock signals synchronized with the data bit cells;

means for generating phase error signals indicating the phase differences between the recovered data bits and the respective data clock signals; and means for generating data windows displaced in time from their normal positions, as dictated by the data clock signals, in response to the phase error signals from said phase error signal generating means.

* * * * *